UNITED STATES PATENT OFFICE.

WILLIAM E. CARSON, OF RIVERTON, VIRGINIA.

PLASTIC MATERIAL AND PROCESS OF MAKING THE SAME.

No. 915,060.   Specification of Letters Patent.   Patented March 9, 1909.

Application filed January 2, 1909.   Serial No. 470,525.

*To all whom it may concern:*

Be it known that I, WILLIAM E. CARSON, a citizen of the United States, residing at Riverton, in the county of Warren and State of Virginia, have invented certain new and useful Improvements in Plastic Materials and Processes of Making Same, of which the following is a specification.

This invention relates to plastic materials and processes of making same; and it comprises a cementitious plastic material comprising an unset hydrated composition of alumina and an alkaline earth; and it also comprises a method of making such plastic materials comprising the hydration of a mixture of an alkaline earth and hydrated alumina, or material containing hydrated alumina, in the presence of moisture, such hydration being arrested at a point short of producing a permanent set; all as more fully hereinafter set forth and as claimed.

In the cement making art, it is customary to furnace together, or "burn" mixtures of calcium carbonate and silicate of alumina, such mixture being either natural, as in cement rock, or artificial, as in making Portland cement. The calcium carbonate may be used as limestone, marl, shells, etc., and the silicate of alumina may be contained in clay, slate, etc. This burning produces a hard fused or semi-fused mass of clinker which is afterward ground to produce the commercial cement. In the burning operation the constituents (silica and alumina) of the silicate of alumina combine with the lime to produce a series of compounds which are not well understood, but probably comprise calcium silicate and calcium aluminate together with various combinations of these bodies. On moistening with water, new hydrated compounds are formed and it is to the production of these hard hydrated compounds that the setting of the cement in use is due. As to the nature of these hydrated compounds nothing definite is known.

I have discovered that by a moist treatment of preformed quicklime in the presence of alumina hydrate, or substances containing the same, such as bauxite, that is by hydrating a mixture of lime with hydrated alumina in the presence of moisture, under regulated conditions, I can produce new hydrated cementitious compositions which, with further hydration and other reactions, in use will set to form plastics of a nature generally like that of set cement but differing specifically therefrom and very advantageous for many uses, as for making hard wall plasters. As to the nature of these compounds or of the reactions which take place, I am at present unaware, but apparently the lime and the alumina unite together to form new chemical compounds during or prior to the hydration of the lime, which compounds on further hydration, have setting properties, producing still other bodies of a hard nature, and these compounds apparently react with lime and other bodies found in plastics, still further to produce new bodies of advantageous properties. For the sake of convenience the action which takes place when hydrate of alumina, quicklime and moisture act upon each other simultaneously, may be termed a cohydration of the lime and alumina.

In lieu of bauxite I can employ other natural bodies consisting of or containing hydrated alumina, such as gibbsite, daispore, alumniferous clays, etc. For some purposes where dark colors are unobjectionable or are desirable, the ferric or chromic hydrates may replace part or all of the alumina. Ferric hydrate is apt to occur in bauxite, clays and native alumina hydrates. But where white compositions are desired, ferric hydrates are undesirable and the alumina hydrate should be at least fairly free of iron. The lime may contain more or less magnesia, strontia, or baryta, but is preferably a fat rich lime consisting mainly of calcium oxid. Hydraulic limes, that is limes from limestones containing clay and silicates, may be used but are disadvantageous because of the slowness of their reaction with water and alumina. The same is true of Portland and other cements and in a greater degree. The hydraulic limes and cements may be employed in mixtures under the present invention, but a good, quickly slaking lime is preferable in producing the initial alumina compound.

The bauxite or its equivalent may be fine-ground and added to the lime, also preferably fine ground, or the bauxite and lime may be ground together. Just enough water to slake the lime may then be added. This of course produces considerable heat and under this heat the moist alumina and the quicklime unite to produce new compounds. Under this method of procedure, the product will be a hydrated, dry powder which, on addition of further water, sets to form a hard body. This powder may be mixed with further lime, hydrated or unslaked; or with hydraulic lime or cement, to promote or accelerate setting. The stated dry powder may be admixed with any amount of cement or lime, hydrated or unhydrated, and marketed as a dry powder, ready, upon application of water to set to form hard calcareous plastics.

A proportion of 1 part of bauxite, or an equivalent amount of another substance containing hydrated alumina, may be admixed advantageously with 3 parts of lime and the mixture hydrated. Another and advantageous manner of forming the new plastic compositions is to slake lime with water containing the bauxite or other form of alumina in suspension. This insures the alumina reaching all portions of the lime without the necessity for a tedious fine-grinding of the lime. The fine-grinding of the bauxite necessary to obtain floats is mechanically easy. One part of the bauxite floats may be suspended in 6 parts of water to form a cream or milk and this fluid used to slake 3 parts of quicklime. After the reaction, the excess of water may be evaporated off before setting occurs. The heat of the mass will generally be sufficient for this evaporation but artificial heat may be employed. The product is, as before, a compound of cohydrated lime and alumina and, with the proportions given, is chemically basic. The basicity, or the excess of lime, may be increased as may be desired. A similar product is obtained by mixing 1 part of bauxite with 4 parts of water and slaking 6 parts of lime with the mixture. This results in a dry basic mixture. With this mixture, using the quantities specified, may be admixed 88 parts of dry slaked lime to produce a good commercial plastic preparation. This preparation when admixed with sand or other mineral filler, say, 4 parts gives a very good wall plaster. Still another preparation may be obtained by grinding 1 part of bauxite, or a corresponding amount of another material containing alumina hydrate, with 6 parts of lime and slaking the mixture with water; 3 parts of water being a good proportion. For a commercial plaster material, this mixture in the stated quantities may be admixed with 85 parts of hydrated lime. In use, this preparation may be admixed with the necessary amount of gaging water and, say, 3 parts of sand to form a wall plaster. This gives a rather better plaster than the preceding recipe. Another similar preparation may be made by dry-grinding 1 part of bauxite with 54 parts of lime and slaking with only sufficient water to give a dry body. On mixing this preparation with three times its bulk of sand, a good preparation is obtained.

In any of the above compositions, the sand or other filler can be mixed with the dry plastic to produce a composition which can be packaged and stored indefinitely and which will be ready to produce plasters, etc., upon simple addition of water. In any of the stated compositions, a per cent. or so of gypsum may be incorporated to serve as a retarder.

On admixture with water, or gaging, the stated compositions, obtained from the proportions specified, set to a hard body in a few hours. Lime or cement mixed with more or less of alumina-lime compound has its set accelerated and improved.

The new body, with or without admixture with further lime or cement, or both, forms hard plastics which may be used for hard wall plasters and concretes. Sand, rock meal and other fillers may be employed.

A mixture of any desired relative amount of the dry hydrated accelerant with dry hydrated, or partially hydrated lime may be sold as a plastic material. Any desired amount of filler may be contained in such powders. Ground marble or limestone used as a filler in such a composition has the advantage of giving a plastic material ready for setting upon gaging with water and producing a set plastic in which all components are of about equal hardness, thereby permitting easy polishing. In use, such a plastic may of course be employed with an aggregate or body of coarser rock or stone pieces, such as marble or limestone fragments. The cohydrated composition may be used with gypsum, plaster of paris and the like with advantage, but is better employed with the basic cements, such as lime, hydraulic lime and true cement.

There are many plastic clays which contain hydrated alumina in addition to the true silicate of alumina, and these may be employed in proportion to the amount of such hydrated alumina present. The use of tolerably pure alumina hydrate, such as is found in bauxite, etc., is however preferable since the silicate of alumina and other impurities present are not without effect upon the set of the resultant plastic. Similar plastic materials may be obtained by cohydrating lime and magnesia, or mixtures, with ferric hydrates. A suitable ferric hydrate may be obtained by moist oxidation of scrap iron or precipitation and oxidation of pickle liquors. Native hydrates may also be employed. The iron plastics have, however, a deep color which renders them unsuitable for some purposes. Chromic hydrates give a greenish plastic which is available for some purposes. More or less ferric or chromic hydrate may be admixed with the alumina hydrate to produce tinted plastics. While magnesia is suitable, yet since it hydrates with much less readiness than lime, in employing either magnesia or magnesian lime, the use of artificial heat in the hydration may be desirable.

The employment of salts of alumina or the other sesquioxid bases, such as iron and chromium, is not desirable for the present purposes since it leaves the plastic cumbered with lime salts of the acids. In slaking lime with sulfate of alumina, for instance, there is much sulfate of lime formed and the plastic becomes in part a gypsum material. Alum, in addition, leaves sulfate of an alkali, such as potassium sulfate; a readily soluble body which produces efflorescence. With chlorids and other salts of the sesquioxid bases, readily soluble calcium salts are produced which are also undesirable. For this reason, the hydrated sesquioxid bases are best employed as such rather than as salts and the materials used should be substantially free of soluble salts. The sesquioxids themselves are not suitable for present purposes being little reactive at the comparatively low temperatures of lime slaking. Ignited bauxite or hematite, for instance, do not react easily with lime in the wet way. When furnaced with lime these sesquioxids will react readily enough but the substances produced are other than those formed in the described wet way under the present invention and have different properties.

What I claim is:—

1. As a new plastic, a composition comprising a sesquioxid and an alkaline earth, cohydrated in the presence of moisture said composition being hydrated to a degree short of the setting point.

2. As a new plastic, a composition comprising a sesquioxid and an alkaline earth, cohydrated in the presence of moisture said composition being hydrated to a degree short of the setting point and containing an excess of the alkaline earth.

3. As a new plastic, a composition comprising a sesquioxid and lime, cohydrated in the presence of moisture said composition being hydrated to a degree short of the setting point.

4. As a new plastic, a composition comprising a sesquioxid and lime, cohydrated in the presence of moisture said composition being hydrated to a degree short of the setting point and containing an excess of lime.

5. As a new plastic, a composition comprising alumina and an alkaline earth, cohydrated in the presence of moisture said composition being hydrated to a degree short of the setting point.

6. As a new plastic, a composition comprising alumina and an alkaline earth, cohydrated in the presence of moisture said composition being hydrated to a degree short of the setting point and containing an excess of the alkaline earth.

7. As a new plastic, a composition comprising alumina and lime, cohydrated in the presence of moisture said composition being hydrated to a degree short of the setting point.

8. As a new plastic, a composition comprising alumina and lime, cohydrated in the presence of moisture said composition being hydrated to a degree short of the setting point and containing an excess of lime.

9. As a new plastic, a composition comprising bauxite and lime, cohydrated in the presence of moisture said composition being hydrated to a degree short of the setting point.

10. As a new plastic, a composition comprising bauxite and lime, cohydrated in the presence of moisture said composition being hydrated to a degree short of the setting point and containing an excess of lime.

11. As a new plastic, a composition comprising bauxite and lime cohydrated in the presence of moisture with other cementitious ingredients, said composition being hydrated to a degree short of the setting point.

12. The process of producing plastic materials which comprises mixing a hydrated sesquioxid and an alkaline earth and producing a mutual reaction in the presence of a limited amount of water.

13. The process of producing plastic materials which comprises mixing hydrated alumina and an alkaline earth and producing a mutual reaction in the presence of a limited amount of water.

14. The process of producing plastic materials which comprises mixing hydrated alumina and lime and producing a mutual reaction in the presence of a limited amount of water.

15. The process of producing plastic materials which comprises mixing bauxite and lime and producing a mutual reaction in the presence of a limited amount of water.

16. The process of producing plastic materials which comprises slaking lime with bauxite suspended in a limited amount of water and removing the excess of moisture.

In testimony whereof, I affix my signature in the presence of witnesses.

WILLIAM E. CARSON.

Witnesses:
   A. P. FERGUSON,
   R. C. BELL.